April 2, 1963     T. E. RONAY     3,084,085
IMPACT RESISTANT LAMINATE
Filed Jan. 30, 1959
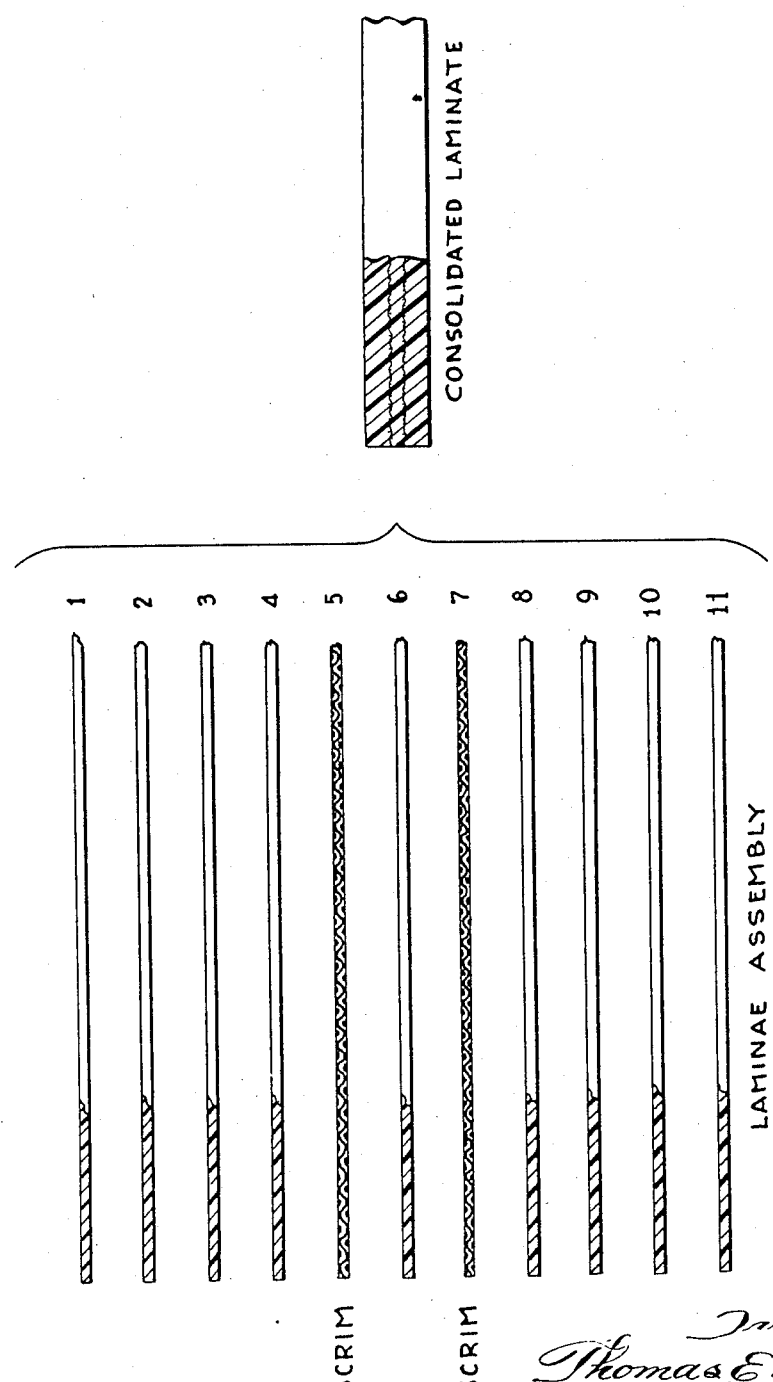
Inventor
Thomas E. Ronay
By John L. Hutchinson
attorney

United States Patent Office 3,084,085
Patented Apr. 2, 1963

3,084,085
IMPACT RESISTANT LAMINATE
Thomas E. Ronay, Oak Park, Ill., assignor to The Richardson Company, Melrose Park, Ill., a corporation of Ohio
Filed Jan. 30, 1959, Ser. No. 790,241
4 Claims. (Cl. 154—43)

This invention is concerned with synthetic laminates and, more particularly, with laminates having improved impact strength.

Synthetic laminates have found wide use in the electrical and electronic industries as insulation media for electrical elements and as a support for electrical components. In view of the increasing demand for enhanced properties, considerable research is currently underway to improve not only the electrical properties of synthetic laminates, but also their physical properties.

In general, synthetic laminates are board-like in character and are made by consolidating a plurality of resin-impregnated filler sheets under heat and pressure. Phenolic-aldehyde resins are most commonly used in making such laminates, while filler sheets are predominantly cellulosic paper. Where enhanced properties are desired, it is customary to use more expensive fillers, such as linen or canvas fillers.

Accordingly, it is one of the primary objects of this invention to improve certain properties of electrical grade laminates derived from cellulosic paper filler and, particularly, impact strength without appreciably affecting the other physical or electrical properties normally required for such laminates.

Another object is the production of a laminate of the foregoing type which may be manufactured readily at competitive costs.

These and other objects are accomplished by use of an open-weave nylon cloth which is inserted between laminae or plies of a laminate build-up at predetermined points prior to consolidation of the laminae into an integral product. The particular cloth contemplated is frequently referred to as a "scrim." In general, scrims have a thread count of about 4 x 4 to 40 x 40 per inch. Thread counts above 40 x 40 per inch, and especially those in the area of 100 x 100 per inch, are characteristic of fabrics and, hence, are distinguishable from scrims. Scrim weights may, of course, vary to some extent, but, in general, those scrims having a weight of between about one to three ounces per square yard are satisfactory, with a weight of approximately one to two ounces per square yard being preferred.

As indicated, the particular scrim employed in the present invention is one made from nylon fibers. Scrims made from such fibers have been found to impart the maximum properties desired in a laminate as compared to scrims made from other fibrous materials, for example, cellulose or glass. As is well known to those familiar with the polymer art, nylon is a polyamide and may be formed by reaction of a dicarboxylic acid with a diamine or by the self-polymerization of a monoamino-monocarboxylic acid or by the polymerization of a lactam, such as caprolactam. In general, nylon is available in two commercial types, namely nylon 6 and nylon 66.

Normally, scrims are made with a definite weave, generally, either a plain weave or a leno weave. The plain weave is characterized by a simple over and under relationship of the longitudinal and latitudinal threads comprising the scrim. The leno weave is characterized by having all strands in one direction composed of two threads twisted, whereby all the single threads extending transversely are substantially locked in position. In many instances, it has been found desirable to coat the threads of a plain weave scrim with resinous materials which serve to maintain the threads in position. Plain weave scrims provided with resinous coatings have been found particularly advantageous in forming laminates as contemplated by the present invention. Preferably, the resinous materials employed for coating the threads of the scrim should be thermoplastic, examples of which are polystyrene, polyvinyl chloride, polyvinyl acetate, and polyvinyl alcohol. Such resinous materials are normally applied to the scrim in the form of latices. In addition to thermoplastic resins, certain elastomers also may be used with satisfactory results. Typical elastomers are polybutadiene, neoprene, and natural rubber. These elastomers are, likewise, generally applied to the threads of the scrim as latices. Other similar thermoplastic resin or elastomer coatings also may be used provided they are capable of forming films at substantially room temperature and also provided that they do not have properties which would adversely effect the electrical characteristics of a particular laminate containing the scrim.

Between 1–4 layers of scrims may be used in a laminate averaging about one-sixteenth of an inch thick. Preferably, the scrims are positioned within the laminate so as to provide the laminate with a balanced structure. Thus, if one scrim is used, it should be placed in approximately the center of the laminate. If two scrims, for example, are found desirable, they should be placed in substantially equal positions within the laminate build-up on opposite sides of the center of the laminate.

Because of the open mesh characteristic of scrims, they normally will not retain resin as can the filler sheets of the laminate. Accordingly, whenever more than one scrim is used, the scrims should not be placed adjacent to one another, but rather should be placed between individual laminae whose resin can then serve to fill the interstices between the threads of the scrim.

Nylon scrims, as additives to paper-base laminates, may be used with a variety of impregnating resinous compositions employed in making the laminates. Illustrative resins are those formed by condensing formaldehyde with urea, melamine or dicydiamide; or polyurethane resins which may be formed from polyethers or polyesters and a diisocyanate, such as tolylene diisocyanate; or epoxy resins, such as bisphenol-epichlorohydrin reaction products cured with polyamines or acid anhydrides. However, the usual electrical grade laminate is formed by impregnating a filler sheet with a phenolic resin. Typical phenolic resins are those formed by condensing an aldehyde, such as formaldehyde, with phenol, cresol, xylenol, and resorcinol or mixtures thereof. Normally, the filler sheets are impregnated with a solvent mixture of a phenolic resin in substantially the "A" stage following which the saturated sheets are subjected to a drying operation to remove the volatiles and partially advance the cure of the resin. After drying, a plurality of the sheets are superimposed to form a stack or build-up and and then are consolidated by subjecting the build-up to heat and pressure for a predetermined period. For phenolic resins, the laminating pressure is generally in the vicinity of approximately 900–1500 pounds per square inch and temperatures about 280–350° F., the press period extending from approximately sixty to ninety minutes. It will be appreciated that these particular conditions will vary from resin to resin and also will depend to some extent on the number of laminae to be consolidated and the particular filler sheets used. In general, to form a paper-base phenolic resin laminate having a thickness of about one-sixteenth of an inch, approximately six to twelve laminae are required depending upon the type of paper used or its base weight.

When employing scrims of the type herein contemplated to improve the properties of paper-base laminates, the scrims are normally placed between the desired laminae when forming the build-up, the whole assembly then being consolidated by heat and pressure in the aforementioned manner. The drawing illustrates one example of using scrims to form a synthetic laminate. As illustrated, the laminate is composed of eleven plies. Actually, two resin impregnated plies have been removed and two scrims, designated sheets 5 and 7, inserted in their place. It is to be noted that the scrims are not positioned adjacent to one another in the build-up, but rather are disposed on opposite sides of the center sheet 6 of the laminate and between two resin impregnated filler sheets 4 and 6 and 6 and 8, respectively. During the heat and pressure treatment, resin from sheets 4 and 6 will be displaced into the interstices of the scrim 5 and, correspondingly, resin from sheets 6 and 8 will be dispersed in the interstices of the scrim 7.

As previously indicated, the use of at least one nylon scrim will appreciably improve the impact of a paper-base laminate and further improvement may be expected with the addition of up to a total of four scrims for a laminate of one-sixteenth of an inch thick with proportionately more scrims for additional laminate thickness. However, the use of more than four scrims in a one-sixteenth inch thick laminate and eight scrims in a one-eighth inch thick laminate tends to reduce the thermodimensional stability of the laminate and, accordingly, a larger number of scrims are, in general, to be avoided. It has been found that the preferred scrims are those having a thread count in both directions of between about ten to thirty threads per inch.

While the principles involved are not completely understood as to why scrims of the type contemplated, and especially those having a thread count within the preferred range, enable the attainment of improved properties in paper-base laminates, it is generally believed that the improvements are achieved by reason of the fact that the softer nylon scrim employed is not as thoroughly imbedded in a hard resin matrix to the extent that exists with the paper fillers of the laminate. This theory is based on several observations made by varying conditions. Thus, if a nylon fabric is used in lieu of a scrim and the fabric is impregnated with a resin prior to assembly in the laminate build-up, no particular improvement is noted in the final consolidated product, apparently due to the fact that the nylon fabric is completely encased in a hard resin matrix. The same situation is observed when the number of threads per inch of a scrim are in the lower part of the above referred to range, for example, below ten per inch. In such instances, it is believed that the wide openings between threads permit a considerable amount of resin from adjacent impregnated paper fillers to flow into the openings between threads, whereby again the nylon threads are completely encased in a hard resin matrix. An intermediate degree of penetration of resin into the scrim interstices appears to be the condition wherein maximum properties obtainable are realized.

Preferably, the scrims should be placed near the center of the build-up, although for special applications, a scrim may be placed immediately beneath a surface sheet. However, when a laminate is made with the scrim in the latter position, the presence of the scrim tends to telegraph through to the surface of the laminate.

The use of cellulose and glass fiber scrims have improved impact properties of a laminate to some degree, however, the improvement is considerably below that obtained by using nylon scrims. In general, it is found that a cellulose scrim will improve impact properties approximately fifty percent and a glass scrim will improve impact properties about one hundred and fifty percent based on the impact values of a laminate made without using such scrims. These improvements are to be compared to those obtained using an equivalent number and type of nylon scrims wherein tests have shown that the impact properties have been improved to be extent of about three hundred percent without, however, materially affecting costs. Further, the presence of glass fiber scrims offers certain disadvantages in fabricating laminates containing such scrims in that the glass fibers tend to damage fabricating tools, such as punching dies and, in general, render fabricating more difficult.

Following are illustrative examples of paper-base laminates made using various scrims, the examples demonstrating the improvement obtained by using nylon scrims in accordance with the present invention. All filler sheets were Hurlbut BC-10 cotton linters paper impregnated with from forty-five to sixty percent by weight of a phenol-cresol-formaldehyde resin, eleven plies, including the scrim, being used in the laminate assembly of each example. The laminates were formed under a pressure of 1100 pounds per square inch at a temperature of about 300° F. for a period of approximately ninety minutes.

|  | 1 | 2 | 3 | 4 |
|---|---|---|---|---|
| Type of Scrim | None | Glass | Nylon | Nylon |
| Number of Scrim |  | 2 | 2 | 3 |
| Thread Count/Inch |  | 23 x 23 | 23 x 23 | 23 x 23 |
| Flexural Strength, p.s.i. (L)[1] | 22,860 | 15,360 | 18,000 | 21,800 |
| Flexural Strength, p.s.i. (C)[2] | 20,900 | 14,200 | 15,500 | 18,100 |
| Edge Impact (L) | .45 | 1.14 | 1.91 | 3.08 |
| Edge Impact (C) | .47 | .78 | 1.65 | 2.44 |

[1] (L)—lengthwise.
[2] (C)—crosswise.

Flexural strengths were determined in accordance with the procedure specified in ASTM Test No. D790-49T, while edge impact values (ft. lbs./in. notch) were determined in accordance with the procedure of ASTM Test No. D256-54T.

It is of interest to note in the above examples that, while use of nylon scrims may tend to reduce to a slight extent the flexural strength of a laminate not containing such scrims, the flexural strength of laminates containing nylon scrims is better than the same laminates containing glass scrims.

Having described the invention and certain exemplary embodiments thereof, the same is intended to be limited only by the scope of the following claims.

I claim:
1. A hard, board-like synthetic laminate having improved impact resistance comprising an assembly of a plurality of paper sheets impregnated with a heat-hardened phenolic-aldehyde resin having embedded between two of said sheets a nylon scrim which has a thread count of between about ten by ten to thirty by thirty threads per inch and a weight of approximately one to three ounces per square yard, said assembly having been consolidated as an integral unit by heat and pressure.

2. A synthetic laminate as described in claim 1 containing a single scrim disposed in substantially the center of said laminate.

3. A synthetic laminate as described in claim 1 wherein the scrim has a plain weave.

4. A synthetic laminate as described in claim 3 wherein the threads of said scrim are coated with a thermoplastic resin to assist in maintaining the threads in their woven position.

References Cited in the file of this patent

UNITED STATES PATENTS

| 1,414,420 | Kempton | May 2, 1922 |
| 2,388,184 | Ripper | Oct. 30, 1945 |
| 2,620,851 | Brown | Dec. 9, 1952 |
| 2,708,177 | Fries et al. | May 10, 1955 |
| 2,766,164 | Salem | Oct. 9, 1956 |
| 2,766,453 | Frieder et al. | Oct. 16, 1956 |
| 2,774,698 | Jenk et al. | Dec. 18, 1956 |
| 2,788,052 | Schulman | Apr. 9, 1957 |
| 2,794,756 | Leverenz | June 4, 1957 |